United States Patent [19]

Miller et al.

[11] Patent Number: 4,762,976
[45] Date of Patent: Aug. 9, 1988

[54] ELECTRODE HOLDER

[75] Inventors: Richard M. Miller, Windsor; Douglas J. Cote, Tecumseh, both of Canada

[73] Assignee: Newcor Canada, Ltd., Windsor, Canada

[21] Appl. No.: 883,795

[22] Filed: Jul. 9, 1986

[51] Int. Cl.$^4$ .............................................. B23K 11/30
[52] U.S. Cl. .................................... 219/119; 219/86.25
[58] Field of Search ............. 219/119, 120, 108, 86.25

[56] References Cited

U.S. PATENT DOCUMENTS

| 465,866 | 12/1891 | Lemp | 219/119 |
|---|---|---|---|
| 3,632,958 | 1/1972 | Width | 219/120 |
| 4,417,122 | 11/1983 | Thorne | 219/108 |

FOREIGN PATENT DOCUMENTS 3436105 10/1985 Fed. Rep. of Germany ... 219/86.25

Primary Examiner—E. A. Goldberg
Assistant Examiner—C. M. Sigda
Attorney, Agent, or Firm—Flynn, Thiel Boutell & Tanis

[57] ABSTRACT

An electrode holder for conducting welding current from a power source via a base plate, a hollow body, and an electrode shaft which is slidably supported within and projects outwardly of the hollow body. The shaft has an enlarged head axially slidably supported within the hollow body and carrying thereon an electrical contact structure which is spring-urged for uniform slidable contact with both the head and the hollow body to effect efficient and uniform transfer of current therebetween. The head has channel-like recesses extending transversely on opposite sides thereof, and an identical contact structure is associated with each recess. The contact structure, in the preferred embodiment, includes a pair of contact blocks disposed adjacent opposite sides of the respective recess and spring-urged apart so that oppositely directed side surfaces on the blocks are slidably engaged with opposite side surfaces of the head to define a current transfer path. The pair of contact blocks are also spring-urged outwardly so that outer surfaces thereof are slidably engaged with an inner surface of the tubular housing to define a current path therebetween.

7 Claims, 2 Drawing Sheets

ELECTRODE HOLDER

FIELD OF THE INVENTION

This invention relates to an improved holder for a welding electrode.

BACKGROUND OF THE INVENTION

One conventional and well-known type of electrode holder employs an electrode spindle or shaft axially slidably supported within a hollow body, with the electrode shaft being urged outwardly by a compression spring which is disposed within and coacts between the body and the shaft. To effect transmission of welding current from the body to the shaft, a split conical collar is interposed between one end of the spring and an enlarged head on the shaft, which head and collar have opposed conical surfaces whereby the urging of the spring causes the split collar to be slidably urged radially outwardly for slidable engagement with the surrounding annular wall of the body. Current transmission is effected from the hollow body through the annular wall to the split collar, and thence through the contacting conical surfaces to the head of the shaft. This arrangement is illustrated by U.S. Pat. No. 3,632,958.

As a further variation of the electrode holder of the above type, there is often provided a second split conical collar interposed between the other end of the spring and the adjacent end of the tubular housing, with this second collar and housing end having conical walls, whereby this second collar is spring-urged radially inwardly due to the conical relationship for snug slidable engagement with the electrode shaft. Welding current is transmitted from the tubular housing through the contacting conical surfaces to the collar, and thence radially inwardly to the shaft. This arrangement is illustrated by FIG. 2 of U.S. Pat. No. 4,417,122.

With electrode holders of the type employing split conical collars functioning as the electrical contact members, it has been observed that maintaining proper electrical contact between the relatively slidable contact surfaces, specifically between the slidable conical contact surfaces, is difficult. For example, when using a split conical contact collar, the radial displacement of the collar segments necessarily changes the proper bearing engagement between the opposed conical surfaces since the conical surface on the split collar can obviously be perfectly theoretically generated only for one precise radius, and any deviation from this radius results in less than the theoretically optimum fit between the opposed conical surfaces. During actual utilization of electrode holders employing such conical contact surfaces, it has been observed that these surfaces necessarily generate substantial electrical resistance due to less than optimum slidable fit therebetween, whereupon this poor electrical contact necessarily result in undesired and oftentimes excessive heat build-up and an arcing condition, which in turn can result in premature failure or shortened life of the electrode holder.

Another disadvantage associated with electrode holders of the aforementioned type is caused by the fact that the current contact members, and the contact pressure which exists across at least the conical contact faces, is created by the same spring which axially urges the electrode shaft outwardly of the housing. The contact pressure on the conical faces is thus dependent on and variable in accordance with the position of the electrode shaft, which position obviously determines the compression and hence the magnitude of the restoring force of the spring.

Accordingly, it is an object of this invention to provide an improved electrode holder which overcomes the abovementioned disadvantages. More specifically, this invention relates to an improved electrode holder which is believed to provide more optimum slidable contact both between the housing and contact structure, and between the contact structure and electrode shaft, so as to permit more efficient transfer of electrical current from the housing to the electrode shaft throughout the complete range of shaft movement, whereby excessive and undesired heating and arcing at or in the vicinity of the contact surfaces can be avoided, and hence the overall life of the electrode holder can be significantly increased.

Another object of the present invention is to provide an improved electrode holder, as aforesaid, in which the contact pressure at the contact surfaces between both the housing and the electrode shaft is uniform through the complete stroke or displacement of the electrode shaft, and independent of the spring force which urges the electrode shaft axially, so as to optimize the current transfer efficiency and hence the life of the electrode holder.

A further object of the invention is to provide an improved electrode holder, as aforesaid, which is economical to manufacture and assemble, which is simple and dependable in operation, and which is simple and inexpensive to repair if necessary.

Other objects and purposes of the invention will be apparent to persons familiar with structures of this general type upon reading the following specification and inspecting the accompanying drawings.

SUMMARY OF THE INVENTION

The electrode holder of this invention includes a substantially tubular body which, in the preferred embodiment, is of a substantially rectangular cross section. An electrode shaft is axially slidably supported within and projects outwardly of the body. The electrode shaft has an elongated stem which projects axially outwardly of the body and is secured to a transversely enlarged head part which is slidably supported within the body. The head part has a pair of transversely extending channel-like recesses formed on opposite sides thereof, and identical contact structures are disposed within each of the recesses. Each contact structure includes a pair of contact blocks which are spring-urged apart in the axial direction of the holder so that the oppositely directed outer surfaces of the contact blocks are disposed in spring-urged slidable engagement with the opposed side surfaces of the recess so as to create a current-conducting path therebetween. A series of small compression springs are confined by and between the pair of contact blocks for urging the latter outwardly away from one another. The contact blocks are also spring-urged outwardly of the respective recess so that the outer surfaces of the contact blocks are maintained in uniform sliding contact with an opposed inner surface as formed on the tubular body so as to define a current-conducting path from the body to the contact blocks. A series of small compression springs coact between the head part and each contact block for urging the latter outwardly for engagement with the respective inner surface of the body. Since each of the recesses has a similar pair of contact blocks disposed therein and spring-urged outwardly, the contact blocks of the two pairs are spring-urged outwardly for engagement with opposed and substantially parallel inner surfaces defined on opposite sides of the tubular body, whereby the electrode shaft is substantially slidably supported on the tubular body due to the slidable engagement between the body and the contact blocks. The head part preferably does, however, have wear strips of nylon or the like provided on surfaces thereof and positioned for slidable engagement with interior surfaces of the tubular body so as to minimize frictional contact with the body and hence increase the life of the electrode holder.

Figure 3:
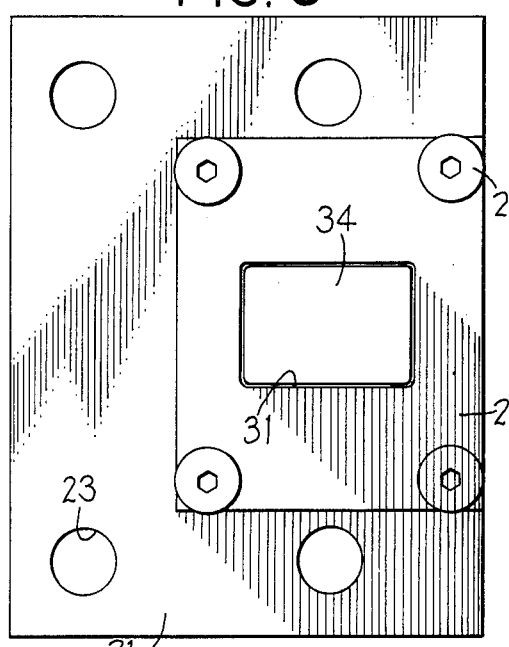
FIG. 3 is a bottom view of the electrode holder as appearing in FIG. 1.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the holder and designated parts thereof. Said terminology will include the words specifically mentioned, derivatives thereof, and words of similar import.

DETAILED DESCRIPTION

Figure 1:
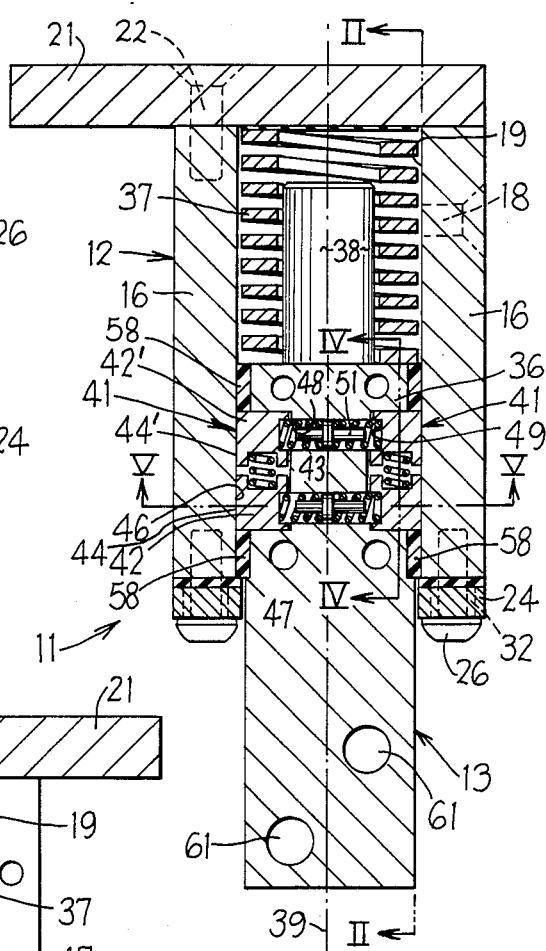
FIG. 1 is a central sectional view as taken substantially along line I—I of FIG. 2.
Figure 2:
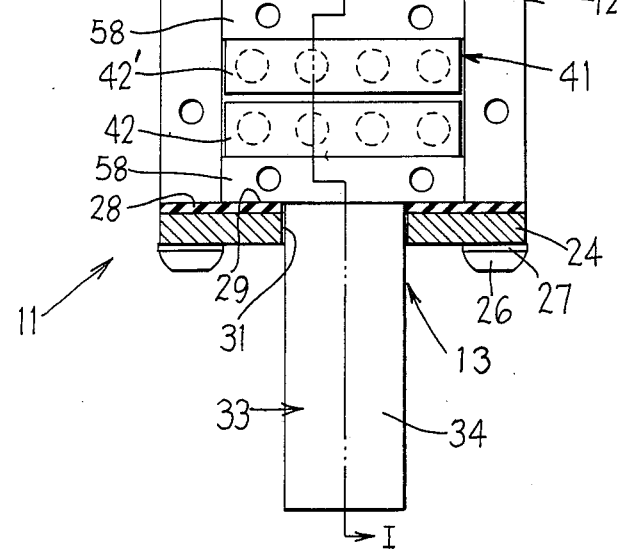
FIG. 2 is an elevational view, partially in cross section, as taken substantially along line II—II in FIG. 1.

Referring to the drawings, and specifically FIGS. 1 and 2, there is illustrated an electrode holder 11 according to the present invention. This holder includes a body structure 12 which axially slidably supports a spring-urged electrode shaft means 13. The electrode holder 11 is adapted to be mounted in a conventional manner on a welding machine, with the body structure being connected in a conventional manner to a current shunt. In the drawings, the holder is illustrated as mounted with the shaft means projecting downwardly for engagement with a workpiece to be welded, although it will be appreciated that the holder can obviously be either reversely vertically or sidewardly oriented if desired.

The body structure 12 includes a tubular body which, in the preferred embodiment, is of substantially rectangular cross section and is defined by opposed substantially parallel side plates 16 rigidly joined together by substantially parallel end plates 17. These plates 16 and 17 are suitably fixed together as by screws 18. The tubular body 16-17 defines an elongate passage or chamber 19 therein which is of a substantially rectangular cross section.

Body structure 12 includes, at the upper end thereof, a base plate 21 which is fixed to the tubular body, as by screws 22. This base plate 21 effectively closes off the upper end of the chamber 19. The base plate 21 is generally of a transversely enlarged configuration so as to permit a current shunt (not shown) to be attached thereto in a conventional manner. Further, the base plate typically has a pattern of openings 23 therethrough for permitting attachment of the holder to the head of a welding machine, the configuration of the base plate 21 and its pattern of openings 23 being selected in accordance with the required mounting of the welding machine.

The body structure 12, at the lower end thereof, is provided with an end plate arrangement which includes an end plate 24 fixedly secured to the tubular body, as by screws 26. These screws 26 preferably have insulating washers 27 under the heads thereof, with the bodies of the screws being surrounded by insulating sleeves 32 which extend through the end plate 24. The end plate arrangement also preferably includes a thin insulating plate 28 which is interposed between the end plate 26 and the tubular body. The end plate structure, specifically the inner surface of the plate 28, defines thereon a stop surface 29 for limiting the outward (that is, the downward) extension of the shaft means 13. This end plate structure has a substantially rectangular opening 31 extending therethrough in coaxial alignment with the chamber 19, which opening 31 is of reduced cross section relative to the chamber 19.

The electrode shaft means 13 is formed primarily by a substantially T-shaped shaft member 33. This shaft member 33 includes a vertically elongated stem or leg 34 which slidably projects axially outwardly through the opening 31, the stem 34 having a cross section which closely conforms to that of the opening. This stem 34, at its upper or inner end, is fixedly secured to a transversely enlarged head part 36 which is axially slidably disposed within the chamber 19.

The shaft member 33 is continuously urged axially downwardly and normally maintained in the extended position illustrated in FIG. 2 by means of a main compression spring 37 which is confined within the tubular body. This compression spring has the opposite ends thereof seated against the base plate 21 and the head part 36 so as to continuously urge the shaft member 33 outwardly (downwardly), and normally maintain the head part 36 seated against the stop surface 29. A centering pin 38 is preferably provided concentrically within the spring 37 to prevent buckling of the spring. While this centering pin 38 is fixed to and projects axially upwardly from the head part in the illustrated embodiment, it will be appreciated that the centering pin could also be fixed to and project downwardly from the base plate 21 if desired.

To permit transfer of electrical current from the body structure 12 to the shaft means 13, the latter mounts thereon a contact structure 41. More specifically, the head part 36 of the shaft member 33 mounts a pair of identical contact structures 41 on opposite sides thereof for slidable engagement with the opposed inner surfaces 46 of the sideplates 16. These contact structures 41 are associated with a pair of channel-like recesses 43 which open inwardly from opposite sides of the head part 36, with these recesses 43 extending transversely (specifically perpendicularly) relative to the longitudinal or axial direction 39 of the electrode holder.

Figure 4:
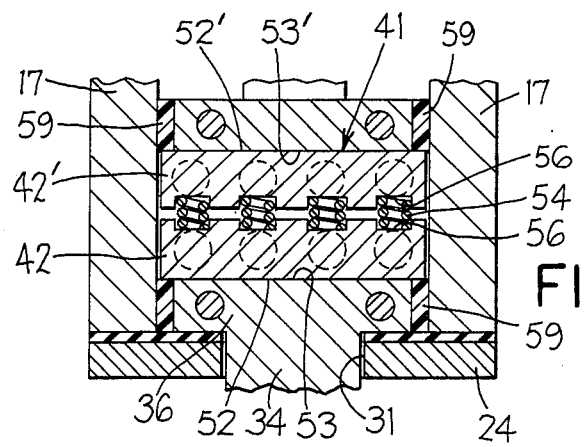
FIGS. 4 and 5 are sectional views as taken respectively along lines IV—IV and V—V of FIG. 1.
Figure 5:
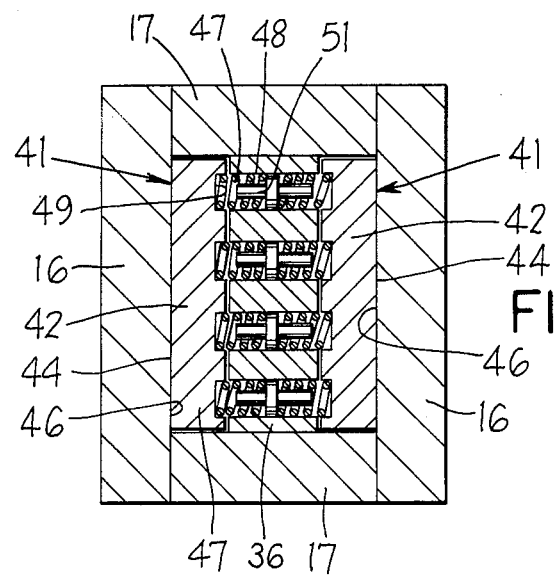

Each contact structure 41 includes a pair of contact blocks 42, 42' (FIG. 4) slidably positioned within the respective recess 43. Each of these contact blocks 42, 42' is elongated in the lengthwise direction of the recess 43 (which lengthwise direction is perpendicular to the axis 39), and the pair of contact blocks 42, 42' are disposed in parallel but spaced relationship relative to said axial direction 39. The pair of contact, blocks 42, 42' respectively have front or outer contact surfaces 44, 44' (FIGS. 1 and 5) thereon which are spring-urged into slidable engagement with the adjacent one of the opposed inner surfaces 46 of the adjacent sideplates 16, whereby there is thus created a path for current transfer from the tubular body to the contact blocks. This contact between the surfaces 44, 44' and 46 is maintained by means of compression-type coil springs 47 which react between the head part 36 and the respective contact blocks 42, 42'. In the illustrated embodiment, a series of four such coil springs 47 reacts against the rear or inner surface of each contact block. Each coil spring 47 is accommodated within a circular recess 48 formed in the head part, with the spring also being partially confined by a shallow recess or pocket 49 formed in the rear of the contact block. An appropriate fixed guide pin 51 projects axially interiorly of the coil spring 47 to prevent relaxing of the spring, this pin 51 being fixedly secured relative to the head part 36.

The cooperating pair of contact blocks 42, 42' also have the oppositely facing side surfaces 52, 52' (FIG. 4) respectively thereof disposed in slidable contact with opposed contact surfaces 53, 53' respectively as defined on the head part 36, these contact surfaces 53, 53' being parallel and in opposed facing relationship with one another. The surfaces 53, 53' define the sidewalls of the respective recess 43. A plurality, here four, of small coil-type compression springs 54 are interposed directly between the pair of contact blocks 42, 42' so as to resiliently urge the contact blocks outwardly away from one another, and maintain the side surfaces 52, 52' thereof in proper seating but slidable contact with the respective surfaces 53, 53'. These spring 54 are preferably individually retained in small recesses or pockets 56 which are formed in the opposed inner side surfaces of the contact blocks. The slidable contact between the surfaces 52 and 53 creates a current path from each contact block to the head part 36 of the electrode shaft.

Since the two contact structures 41 are identical to one another and are disposed on opposite sides of the head part 36, the two pairs of contact blocks 42, 42' are hence resiliently urged outwardly away from one another by the springs 47 so that the outer or front contact surfaces 44, 44' slidably contact the opposed inner surfaces 46 defined on the sidewalls 13. This provides for a uniform frictional contact between the contact blocks and the sidewalls to thereby provide for proper slidable control and support of the head part 36 of the electrode shaft. Further, the frictional force between the surfaces 44, 44' and 46 is a function solely of the springs 47, and hence is wholly independent of the axial spring force exerted on the electrode shaft by the main spring 37.

To facilitate the slidable support of the head part 36, both in terms of uniform friction and minimal wear, the head part 36 is also preferably provided with wear or low-friction strips secured to the outer sides thereof. For example, the opposite sides of the head part 36 are preferably provided with wear strips 58 secured thereto, both above and below the contact blocks as illustrated by FIG. 1, for slidable contact with the inner surfaces of side plates 16. The end surfaces of the head part 36 are also preferably provided with similar wear strips 59 (FIG. 4) secured thereto, which latter wear strips are positioned for slidable contact with the inner surfaces of the end plates 17. These wear strips 58 and 59, which are preferably fixed to the faces of the head part by screws or the like, preferably comprise a hard, low-friction resin or plastics material such as nylon.

OPERATION

While the operation of the electrode holder is believed apparent from the description set forth above, nevertheless same will be briefly described to ensure a complete understanding thereof.

In operation, an electrical potential source is connected to the base plate 21 of the body structure. The electrical current is then transmitted therefrom to the contact blocks 42, 42', and thence to the electrode shaft 13. In a typical usage, the head of the welding machine mounts thereon the electrode holder, and the complete holder is moved downwardly until the electrode mounted on the lower end of the shaft 13 contacts the workpiece to be welded, which downward movement causes some upward displacement of the shaft 13 relative to the housing 12, and at least a limited compression of the spring 37, which latter spring controls the pressure urging the electrode against the workpiece.

Due to the manner in which the current is transmitted from the body structure 12 through the contact blocks 42, 42' to the shaft 13 and thence to the electrode, the electrode holder of the present invention allows for good current flow without causing excessive heating of the contact blocks, and without being affected by the strength and/or degree of compression of the main spring 37.

More specifically, the, contact pressures between the contact blocks 42, 42' and the surfaces 46 and 53, 53' are maintained solely by the springs 47 and 54, respectively, which springs maintain a constant contact pressure with the surfaces 46 and 53, 53'. This pressure at the electrical contact surfaces is independent of the main spring 37 and hence is not influenced by the fact that this main spring is either "soft" or "stiff", and likewise is not influenced by the amount of compression of the main spring 37. The contact pressure, at the electrical contact surfaces 46 and 53, 53' hence remains substantially constant at all times, and is controlled solely by the initial selection of these springs and the initial selection of the appropriate clearances.

The contact in the radial direction as defined between the surfaces 44, 44' and 46 occurs between substantially planar flat surfaces, and similarly the contact in the axial direction between the surfaces 52, 52' and 53, 53' also occurs between substantially planar flat surfaces, these latter surfaces being perpendicular to the surfaces 44, 44' and 46. In this manner, a very uniform contact pressure exists between the opposed cooperating surfaces throughout the full area thereof, and there is thus avoided the creation of areas which would otherwise cause undue resistance and hence excessive heating of the contact surfaces. In this manner, maximum current can be efficiently transmitted across the contact surfaces without encountering excessive resistance and consequent excessive heating.

In situations where the electrode holder is to be used for performing cyclic welding operations at a rather rapid rate, such may require that the electrode holder be provided with means for cooling the electrode. This may require the use of a forced liquid coolant to effect more rapid transfer of heat. In such instance, coolant may be run through passages in the side plates 16 and end plates 17 so as to facilitate the transfer of heat from the electrode shaft 13. Alternately, or in addition, liquid coolant can be supplied directly to the shaft 13, such as to the holes 61 therein, from a source through flexible conduits.

Although a particular preferred embodiment of the invention has been disclosed in detail for illustrative purposes, it will be recognized that variations or modifications of the disclosed apparatus, including the rearrangement of parts, lie within the scope of the present invention.

The invention in which an exclusive property or privilege is claimed is:

1. An electrode holder for electrical welding of a workpiece, comprising:

housing means including a tubular body defining therein an axially elongated chamber, said tubular body having opposed inner surfaces;

electrode shaft means movably supported on said housing means for slidable displacement relative thereto in a direction substantially parallel with the longitudinal axis of said chamber, said shaft means having a head part which is disposed within said chamber and axially slidably supported on said tubular body, said shaft means also including an elongate stem portion which projects axially outwardly from said body for engagement with the workpiece;

a main biasing spring disposed within said chamber in coaxial alignment with said shaft means, said main biasing spring having opposite ends thereof seatingly supported on said housing means and said head part for urging said shaft means axially outwardly of said housing means;

contact means mounted on said head part and slidably cooperating with said tubular body for transmitting electrical current from said tubular body to said shaft means;

said contact means including first and second substantially identical contact structures disposed adjacent opposite sides of said head part and resiliently biased outwardly in opposite directions for slidable engagement with the opposed inner surfaces of said tubular body;

said head part having a pair of substantially parallel and oppositely directed contact surfaces thereon;

each said contact structure including a pair of separate and independently movable contact members, said pair of contact members defining thereon a pair of oppositely directed faces which are respectively maintained in supportive and slidable engagement with said contact surfaces; and spring means urging said contact members in opposite directions for maintaining the faces thereon in supportive and slidable engagement with said contact surfaces, said spring means being structurally and functionally independent of said main biasing spring.

2. An electrode holder according to claim 1, wherein the head part of said shaft means defines recess means therein which open sidewardly toward the opposed inner surfaces of the tubular body, said first and second contact structures being movably disposed within said recess means.

3. An electrode holder according to claim 2, wherein said contact surfaces on said head part are defined on opposite sides of said recess means and extend substantially perpendicular with respect to said inner surfaces of said tubular body, wherein said contact surfaces are disposed in directly opposed facing relationship to one another, and wherein said pair of contact members as associated with each contact structure are resiliently biased away from one another by said spring means.

4. An electrode holder according to claim 2, wherein the pair of contact members defining each said contact structure are disposed in side-by-side relationship and are spaced apart from one another in the longitudinal direction of the electrode holder.

5. An electrode holder according to claim 3, wherein second spring means coact with said first and second contact structures for resiliently urging the contact structures outwardly in opposite directions for engagement with said opposed inner surfaces, said second spring means being independent of said first-mentioned spring means and independent of said main biasing spring.

6. An electrode holder according to claim 5, wherein said opposed inner surfaces extend in generally parallel relationship to one another.

7. An electrode holder according to claim 1, wherein the elongated chamber is of substantially rectangular cross section.

* * * * *